Patented Apr. 20, 1954

2,676,161

UNITED STATES PATENT OFFICE 2,676,161

COMPOSITIONS COMPRISING A POLYMER OF ACRYLONITRILE AND A CYANOMETHYL ESTER

Arthur Cresswell, Stamford, Conn., assignor to American Cyanamid Company, New York, N. Y., a corporation of Maine No Drawing. Application October 31, 1952, Serial No. 318,093

12 Claims. (Cl. 260—31.2)

1

This invention relates to new and useful compositions of matter and more particularly to compositions comprising an acrylonitrile polymerization product and a cyanomethyl ester represented by the general formula I

where R represents a member of the class consisting of hydrogen and the grouping $$-O-CH_2-CN$$

When R represents hydrogen, the compound is cyanomethyl formate,

II
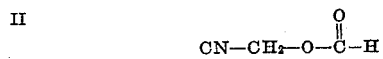

and when R represents the grouping $$-O-CH_2-CN$$

the compound is di-(cyanomethyl) carbonate,

III
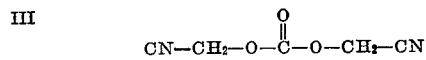

The compositions of this invention in which a cyanomethyl ester of the kind embraced by Formula I is employed primarily as a solvent for the acrylonitrile polymerization product, in which case it constitutes a major proportion (more than 50%), e. g., from 55 to 98% or more, by weight of the composition, are particularly useful in the production of shaped articles therefrom, e. g., filaments, films, threads, rods, tubes and the like. A cyanomethyl ester of the kind with which this invention is concerned also may be used primarily as a plasticizer for an acrylonitrile polymerization product, in which case it usually constitutes a minor proportion (less than 50%), e. g., from 0.5 to 45%, generally from 1 to 35 or 40% by weight of the composition.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 75% by weight of combined acrylonitrile, heretofore have been suggested. For example, in Rein U. S. Patent No. 2,117,210, it is proposed that polyacrylonitrile be dissolved in a quaternary ammonium compound, more particularly a pyridinium compound such as benzyl pyridinium chloride, and that the resulting solution be used in making films, threads and other shaped bodies therefrom. Also, in Rein

2

U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. Other solvents for a polymer of acrylonitrile are disclosed in many other patents, e. g., 2,404,714-2,404,727, 2,517,544, 2,520,150, 2,588,334 and 2,588,335.

The present invention is based on my discovery that polymers and copolymers of acrylonitrile, more particularly polymeric acrylonitrile and thermoplastic copolymers of acrylonitrile, specifically such copolymers containing in their molecules an average of at least 75% by weight of combined acrylonitrile, e. g., copolymers of, by weight, from 75 to 99.5% of acrylonitrile and another monomer such, for instance, as vinyl acetate, methyl acrylate, ethyl acrylate, acrylamide, etc., are compatible with a cyanomethyl ester of the kind embraced by Formula I and that such esters (or mixtures thereof) are capable of dissolving the acrylonitrile polymerization product to yield solutions which are suitable for use in making a wide variety of shaped or fabricated articles, including mono- and multi-filaments, threads, yarns, bars, films, etc., therefrom. The invention is based on my further discovery that the aforementioned cyanomethyl ester or mixture of esters is able effectively to plasticize acrylonitrile polymerization products, so that the latter more easily can be shaped, as by extrusion or molding, into useful articles of manufacture. The cyanomethyl esters employed in practicing my invention may be used either as a fugitive or temporary plasticizer, that is, a plasticizer which subsequently is removed from the polymerization product, or as a permanent plasticizer which is permitted to remain in the shaped polymer or copolymer.

Cyanomethyl formate and di-(cyanomethyl)-carbonate are known compounds, both of which are soluble in water. The boiling point of cyanomethyl formate is about 172° C., while di-(cyanomethyl) carbonate, (NCCH₂O)₂CO, is a solid which has a melting point of about 140° C. The latter compound is prepared, for example, by reaction between two moles of glycolonitrile and phosgene in the presence of pyridine (reference: Patent No. 2,266,199—Hechenbleikner).

Polymeric acrylonitrile and acrylonitrile copolymers (thermoplastic acrylonitrile copolymers) containing in the polymer molecules an average of at least 75% by weight of combined acrylonitrile are employed in carrying the present invention into effect. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practising the present invention, so that the final copolymer contains in the molecules thereof an average of at least 75% by weight of combined acrylonitrile. The expression "polymerization product containing in the polymer molecules an average of at least 75% by weight of combined acrylonitrile," as used herein and in the appended claims, means a polymerization product (polymer, copolymer or interpolymer or mixtures thereof) containing in their molecules an average of at least 75% by weight of the acrylonitrile unit, which is considered to be present in the individual polymer molecule as the group

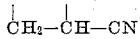

or, otherwise stated, at least 75% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 75% by weight of combined acrylonitrile are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha,beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 75% by weight of combined acrylonitrile. Thus, when the polymerization rate of the monomers present in the polymerizable mixture is substantially the same, the proportions may be, for example, from, by weight, about 75% to about 99% of acrylonitrile to from about 25% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50% by weight thereof in order to obtain a polymerization product containing in the copolymer molecules an average of at least 75% by weight of acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054, Jacobson U. S. Patent No. 2,436,926, and others. The polymeric and copolymeric acrylonitriles used in practicing my invention may be of any suitable molecular weight, but ordinarily the molecular weight (average molecular weight) is within the range of 40,000 to 200,000 or higher, and advantageously is of the order of 50,000 to 100,000, e. g., about 70,000–75,000, as calculated from a viscosity measurement of the polymer in dimethyl formamide using the Staudinger equation (reference: U. S. Patent No. 2,404,713).

The dissolution of the acrylonitrile polymerization product in the cyanomethyl ester is accelerated by using a polymer or copolymer which is in finely divided state, e. g., one which, if not in finely divided state as originally formed, has been ground so that all or substantially all of it will pass through a U. S. Standard Sieve Series No. 50 screen. It also is usually desirable to agitate the mass, as by mechanical stirring, while dissolving the polymerization product in the solvent. To avoid or minimize discoloration of the polymeric or copolymeric acrylonitrile, it is generally advantageous to employ the lowest possible temperature in effecting dissolution or plasticization of the acrylonitrile polymerization product, which temperature is consistent with practical considerations, e. g., the time required for effecting solution, etc.

The proportions of the acrylonitrile polymerization product and cyanomethyl ester in the compositions of my invention may be varied widely, depending mainly upon the particular use for which the composition is intended. If the aforesaid ester is employed primarily as a solvent for the polymer or copolymer so as to obtain a film, filament, thread, yarn, rod, tube or other shaped article from which all or substantially all of the solvent subsequently is removed, then the acrylonitrile polymerization product usually constitutes at least 2%, e. g., at least 4 or 5% but less than 50%, e. g., from 5% to about 25 or 30%, by weight of the composition. Advantageously, in most cases, when the solution is to be used in the spinning of filaments (mono- or multifilaments) or the casting of films, the polymer or copolymer constitutes at least 7 or 8%, e. g., from 10 to 15 or 20%, by weight of the solution.

The aforementioned ranges of proportions are mentioned as indicative of proportions that may be employed in forming solutions of the polymerization product, and my invention obviously is not limited to the use of only such proportions. Especially in spinning and casting applications of the compositions, the important factor is that the proportions be such that the viscosity of the composition at the operating temperature is within a workable range. Satisfactory viscosities at the usual operating temperature generally prevail when the polymer or copolymer constitutes between about 5% and about 20% by weight of the composition, but this also is dependent upon the average molecular weight of the polymerization product. By using special extrusion methods, concentrations of polymer substantially above 20% can be employed satisfactorily. Because the use of the higher amounts of solvent renders spinning operations more costly and difficult due to the trouble often encountered in rapidly removing large amounts of solvent from the solution and due to the cost of such removal, even though the solvent be recovered, it is preferable to use a polymerization product having a molecular weight such that a maximum amount of the polymer or copolymer, consistent with the viscosity of the solution at the operating temperature, can be dissolved in the cyanomethyl ester.

The solutions described above may be used in the production of various fabricated structures such, for example, as films, filaments, bars, rods, tubes, etc., in accordance with general techniques and using apparatus now generally known to those skilled in the art, the detailed operating conditions being suitably modified where required. Reference is made to the aforementioned patents for both general and somewhat more specific descriptions of practices and apparatus employed.

In the production of filamentary material which shows orientation along its longitudinal axis, the originally formed product (from which much, if not substantially all, of the solvent has been extracted or evaporated) is stretched by suitable means to effect the desired orientation. This increases the tensile strength and otherwise improves the properties of the filamentary material. Orientation may be effected by stretching the thread or strand at any suitable stage of the spinning operation. Advantageously, in some cases, spun filament or thread is stretched while it still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200 or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread.

Alternatively, the stretched thread may be led over a thread-storage device on which it may be treated with a suitable solvent to remove all or part of the liquid coagulant (if employed) and/or cyanomethyl ester, after which it may be continuously dried, oiled and taken up on a twisting device such, for instance, as a ring twisting spindle.

The extruded filament or thread may be given part or all of its total stretch while it is being passed through a gaseous medium, e. g., air, nitrogen, flue gases, etc., or through a liquid medium, e. g., ethylene glycol monoethyl ether or other gaseous or liquid medium as may have been employed for extracting the solvent from the solution of the acrylonitrile polymerization product. To obviate or minimize discoloration of the polymerization product, the temperature of the medium in which the polymer or copolymer is stretched and the rate of travel of the strand through the medium should be so adjusted that overheating of the strand does not occur.

The highly stretched product is strong, tough and pliable, and shows a high degree of orientation along its longitudinal axis by X-ray diffraction.

The solvent solutions of the acrylonitrile polymerization product also can be cast in the form of films. For instance, the hot, liquid composition may be cast upon a revolving drum which is partly immersed in a coagulating bath of, for example, the monoethyl ether of ethylene glycol, dioxane, acetone, lower alkyl alcohols, etc., and which will serve to deposit the polymerization product as a thin film on the drum as it passes through the bath. The resulting film may be stretched, if desired, lengthwise and crosswise by suitable apparatus to improve its properties. Alternatively the solutions of polymer in cyanomethyl formate may be evaporated in a gaseous atmosphere to form films which may be similarly stretched to improve their properties.

It will be understood, of course, by those skilled in the art that the temperature of the liquid or gaseous extractive medium should be such as to dissolve or to volatilize the solvent from the extruded mass most rapidly and effectively. The length of travel of the shaped article through the zone or medium in which this is effected may be varied as desired or as conditions may require, but in all cases should be sufficiently long to effect solidification of the polymerization product and to extract from the extruded mass substantially all of the solvent or, if desired, only a part of it, leaving the remainder, e. g., from 0.5 or 1% to 15 or 20% or more, by weight of the whole, in the extruded mass so that it may function as a plasticizer for the polymerization product.

Compositions comprising, by weight, from about 5 or 10% to about 35 or 40% of a cyanomethyl ester of the kind embraced by Formula I and the remainder an acrylonitrile polymerization product containing in the molecules thereof an average of at least 75% by weight of combined acrylonitrile also may be employed as a dielectric or as a component of a dielectric in an electric capacitor. The cyanomethyl ester-plasticized acrylonitrile polymerization product also can be combined with paper, fabrics comprising fibers of an acrylonitrile polymerization product, and other dielectrics.

In order that those skilled in the art better may understand how the present invention can be carried into effect, the following examples are given by way of illustration and not by way of limitation. All parts are by weight.

*Example 1*

Dry, powdered (about 5 to 30 microns in particle size) acrylonitrile polymerization product and cyanomethyl formate are admixed and heated to 100° C., and then maintained at that temperature for 30 minutes.

(A) One part of 100% homopolymeric acrylonitrile and 13.8 parts of cyanomethyl formate are mixed and heated as described above. Evaporation of the clear solution which separates from some undissolved polymers shows that about 2.7% of the polymer has dissolved. From the appearance of the residue, it appears to be a polymer of lower molecular weight than that of the average molecular weight of the original homopolymeric acrylonitrile, indicating that cyanomethyl formate might be used advantageously as a selective solvent for selectively removing low-molecular-weight acrylonitrile polymers from those of high molecular weight in a particular homopolymer of acrylonitrile.

(B) One part of an acrylonitrile copolymer, produced by polymerizing a mixture of 90 parts acrylonitrile and 10 parts acrylamide, and 7.41 parts of cyanomethyl formate are mixed and heated as described above. All of the copolymer dissolves in the cyanomethyl formate, yielding a solution which initially is clear (i. e., while hot) and also remains clear on cooling to room temperature. The solution is very viscous at 20°–30° C. It can be cast into films or wet-spun or dry-spun (but preferably the latter) to form a filamentary material.

*Example 2*

Dry acrylonitrile copolymer of approximately the same particle size as in Example 1 is added portionwise to cyanomethyl formate at 100° C. until a total of 1 part of copolymer to 5.87 parts of solvent has been added. In each copolymer listed below a clear, viscous solution is formed. Films are cast from portions of each solution, and the solvent is allowed to evaporate at room temperature until none can be detected.

| Copolymer Produced from a Mixture of— | Appearance of Film |
|---|---|
| 90% acrylonitrile and 10% acrylamide | Clear, tough and flexible. |
| 80% acrylonitrile and 20% acrylamide | Do. |
| 90% acrylonitrile and 10% hydroxyethyl methacrylate | Clear, tough and rubbery. |
| 90% acrylonitrile and 10% vinyl acetate | Clear, tough and flexible. |

Other portions of each solution are extruded through a spinneret having 40 holes, each 110 microns in diameter, through a heated dry-spinning cell in which the solvent is evaporated from the extruded material. The individual filaments are twisted to form a multifilament thread, which is then stretched at about 150° C. to orient the molecules along the longitudinal axis and thus improve the physical properties of the thread. The percent of stretch imparted to the thread varies from about 200–300% to 600–700% depending upon the particular copolymer and the particular processing conditions employed.

*Example 3*

This example is illustrative of the critical nature of the chemical constitution of the cyanomethyl ester employed, and specifically shows that the next higher homologue of cyanomethyl formate, viz., cyanomethyl acetate, is not a solvent for either homopolymeric acrylonitrile or various copolymeric acrylonitriles.

One part of the acrylonitrile polymerization product is mixed with 50 parts of cyanomethyl acetate and stirred at both room temperature and also at 100° C. The products tested are as follows:

Homopolymer of acrylonitrile
Copolymer produced from a mixture of 95% acrylonitrile and 5% methyl acrylate
Copolymer produced from a mixture of 85% acrylonitrile and 15% methyl acrylate
Copolymer produced from a mixture of 90% acrylonitrile and 10% acrylamide
Copolymer produced from a mixture of 95% acrylonitrile and 5% 2-methyl-5-vinylpyridine.

In all cases the acrylonitrile polymerization product is insoluble in the cyanomethyl acetate at both room temperature and at 100° C.

*Example 4*

To 50 parts of di-(cyanomethyl)carbonate heated to 140°–142° C. is added 1 part of each of the acrylonitrile copolymers listed below, and the resulting mixture is maintained at that temperature for 5 minutes:

Copolymer produced from a mixture of 95% acrylonitrile and 5% methyl acrylate
Copolymer produced from a mixture of 90% acrylonitrile and 10% acrylamide In both cases the acrylonitrile polymerization product dissolves in the hot di-(cyanomethyl)-carbonate to yield brown viscous solutions. On cooling to room temperature the viscous mass solidifies.

*Example 5*

Example 2 is repeated but the evaporative conditions employed in producing the multifilament thread are adjusted so that the thread contains a small amount of the order of 3–5% of residual cyanomethyl formate as a plasticizer, and the resulting plasticized acrylonitrile polymerization product in the form of a multifilament is then stretched to yield a plasticized oriented multifilament or thread of the acrylonitrile copolymer. If desired, the plasticizer subsequently may be removed from the thread, e. g., by either a heat treatment or by extraction with a suitable solvent, for instance hot water.

In a similar manner di-(cyanomethyl)carbonate can be employed as either a fugitive or substantially permanent plasticizer for a filamentary material which shows orientation along its longitudinal axis and which comprises a polymerization product containing in the polymer molecules an average of at least 75% by weight of combined acrylonitrile.

From the foregoing description it will be seen that the present invention provides compositions comprising an acrylonitrile polymerization product (polymer, copolymer or interpolymer) and a cyanomethyl ester of the kind embraced by Formula I as a plasticizer or as a solvent therefor. These compositions can be shaped or fabricated, as by extrusion, molding, casting, etc., into a wide variety of useful articles. Lubricants, antistatic agents and other conventional modifiers of acrylonitrile polymerization products can be incorporated therein at any suitable stage of the operation. Although not limited thereto, the compositions of this invention are particularly useful in the production of filaments, threads, yarns, etc., which thereafter are woven into fabrics, and also as capacitor dielectrics and in other applications of dielectrics. Other uses include those given in the patents mentioned in the early part of this specification.

I claim:

1. A composition of matter comprising (1) a polymerization product containing in the polymer molecules an average of at least 75% by weight of combined acrylonitrile and (2) a cyanomethyl ester represented by the general formula

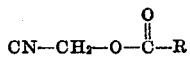

where R represents a member of the class consisting of hydrogen and the grouping

2. A composition of matter comprising (1) a polymerization product containing in the polymer molecules an average of at least 75% by weight of combined acrylonitrile and (2) cyanomethyl formate.

3. A composition of matter comprising (1) a polymerization product containing in the polymer molecules an average of at least 75% by weight of combined acrylonitrile and (2) di-(cyanomethyl) carbonate.

4. A composition as in claim 1 wherein the polymerization product is homopolymeric acrylonitrile.

5. A composition as in claim 1 wherein the polymerization product is a copolymer of copolymerizable ingredients including acrylonitrile and methyl acrylate, the said copolymer containing in the molecules thereof an average of at least 75% by weight of combined acrylonitrile.

6. A composition as in claim 1 wherein the polymerization product of (1) constitutes at least 2% by weight of the composition.

7. A composition of matter comprising (1) a polymerization product containing in the polymer molecules an average of at least 75% by weight of combined acrylonitrile and (2) cyanomethyl formate, the polymerization product of (1) constituting from about 5% to about 30%, by weight, of the total amount of (1) and (2).

8. A composition of matter comprising (1) a polymerization product containing in the polymer molecules an average of at least 75% by weight of combined acrylonitrile and (2) di-(cyanomethyl) carbonate, the polymerization product of (1) constituting from about 5% to about 30%, by weight, of the total amount of (1) and (2).

9. A plasticized composition comprising a polymerization product containing in the polymer molecules an average of at least 75% by weight of combined acrylonitrile, said polymerization product being plasticized with a plasticizing amount not substantially exceeding 40% by weight of the composition of a plasticizer comprising a cyanomethyl ester represented by the general formula

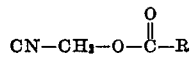

where R represents a member of the class consisting of hydrogen and the grouping

10. A composition comprising a plasticized polymerization product containing in the polymer molecules an average of at least 75% by weight of combined acrylonitrile, said polymerization product being plasticized with from about 1% to about 35% by weight of the whole of cyanomethyl formate.

11. A composition comprising a plasticized polymerization product containing in the polymer molecules an average of at least 75% by weight of combined acrylonitrile, said polymerization product being plasticized with from about 1% to about 35% by weight of the whole of di-(cyanomethyl) carbonate.

12. A filamentary material which shows orientation along its longitudinal axis and which comprises a polymerization product containing in the polymer molecules an average of at least 75% by weight of combined acrylonitrile, said polymerization product being plasticized with from about 1% to about 20% by weight of the whole of a cyanomethyl ester represented by the general formula

where R represents a member of the class consisting of hydrogen and the grouping

References Cited in the file of this patent

UNITED STATES PATENTS

| Number | Name | Date |
|---|---|---|
| 2,404,723 | Merner | July 23, 1946 |